United States Patent [19]
Kind et al.

[11] 3,753,042
[45] Aug. 14, 1973

[54] APPARATUS FOR THE CURRENT LIMITING INTERRUPTION OF CURRENTS AT HIGH VOLTAGES

[75] Inventors: Dieter Kind, Pockelstrasse 4; Hagen Hartel, both of Braunschweig; Jurgen Salge, Salzgitter-Osterlinde; Rudolf Brilka, Salzgitter-Lebenstedt, all of Germany

[73] Assignee: said Kind, by said Hartel, Salge, and Brilka

[22] Filed: Aug. 4, 1971

[21] Appl. No.: 168,967

[30] Foreign Application Priority Data
Aug. 4, 1970  Germany.................... P 20 38 624.7

[52] U.S. Cl............. 317/11 A, 317/11 B, 317/11 E, 307/136
[51] Int. Cl. ........................................... H02h 7/22
[58] Field of Search .............. 317/11 A, 11 B, 11 D, 317/11 E, 11 R; 307/136; 200/144 AP

[56] References Cited
UNITED STATES PATENTS
2,849,659  8/1958  Kesselring....................... 317/11 E Primary Examiner—D. F. Duggan
Assistant Examiner—Harvey Fendelman
Attorney—George H. Spencer et al.

[57] ABSTRACT

An improved circuit for the current limiting interruption of currents in a power main at high voltages of the type wherein an energy absorbing circuit and a capacitor are each connected across the interrupter or commutation switch, and the capacitor is precharged so that upon opening of the switch the discharge current of the capacitor will oppose the current flowing through the switch and cause it to flow through the energy absorbing circuit. Circuit means are provided which causes charging of the capacitor only during the opening of the interrupter switch to a value which is dependent on the arc voltage at the interrupter switch and/or the current in the main so that sufficient time is available to the switch during the commutation phase to increase its arc resistance to an extent sufficient to commutate the main current into the parallelly connected capacitor and accordingly into the energy absorber and prevent the main current from commutating back into the switch.

10 Claims, 8 Drawing Figures

3,753,042

APPARATUS FOR THE CURRENT LIMITING INTERRUPTION OF CURRENTS AT HIGH VOLTAGES

BACKGROUND OF THE INVENTION

The invention relates to an improved apparatus for the current limiting interruption of direct or alternating currents at high voltages. More particularly the present invention relates to an improved apparatus for this purpose in which a capacitor is connected across a switch (commutation switch) used to switch off the current so that the discharge current from the capacitor opposes the current to be switched off; this discharge current being of such magnitude that the current is forced to commutate to a parallel path having a high resistance so that it is reduced to a quiescent current value which is switched off by a subsequently connected circuit breaker.

With a current-limiting switch-off in direct current as well as alternating current mains, the switching device must produce a switch voltage after actuation which is greater than the driving voltage in the circuit and it must absorb the energy furnished by the mains (including the energy stored in the inductances of the mains) during the switching process. These two requirements can be met up to certain current limits by switches having intensive cooling of the arc.

As is known a switch can also be greatly relieved if bypasses are used for the voltage generation and for the energy conversion. This is done, for example, by connecting a capacitor, which is either precharged or uncharged, and an energy absorber in parallel with the commutation switch. The current in the switch is sufficiently reduced after commutation to the energy absorber so that it can be switched off by a quiescent current switch. With suitable dimensioning of the main switch, it is possible to precharge the capacitor at a certain level for a fixed current so that the current will be more easily commutated into the auxiliary commutation circuit and subsequently into the absorber circuit than would be possible if the capacitor were not precharged. The drawback of this process is that precharging of the capacitor requires additional energy and the circuit is optimally designed only for one current value. A current interrupting arrangement such as illustrated in FIG. 1 was for example proposed by D. Kind, E. Marx, K. Möllenhoff, J. Salge in the paper: Circuit-Breaker for HVDC-transmissions. CIGRE 1968, Report No. 13–08.

This method for the current limiting interruption of a current at a high voltage is shown schematically in FIG. 1, wherein L indicates the inductance of the mains or conductor, S is a commutation switch, for instance a circuit-breaker with intensive cooling of the arc and $S_R$ is a quiescent current switch. An auxiliary commutation circuit with an auxiliary switch HS, a capacitor C and a leakage inductance $L_s$, and an absorber circuit A containing an energy absorbing element such as an ohmic resistor R, a voltage dependent resistor R(i) or an inductance $L_1$ are each connected in parallel with the commutation switch S. The mains voltage V causes a current i to flow through this circuit which current initially flows only as the switch current $i_s$ through the commutation switch S and quiescent current switch $S_R$. The capacitor C is assumed to be precharged with the indicated polarity by an external current source. When switch S is opened in order to interrupt the flow of current in the mains, the arc voltage produced will eventually cause switch HS to close, resulting in the circuit formed by C and $L_s$ being connected in parallel with switch S. As a result, a capacitor current $i_c$ flows from capacitor C via the leakage inductance $L_s$, toward switch S in a direction opposed to the direction of flow and current $L_s$ so that current $i_s$ is reduced to a greater or lesser degree depending on its magnitude and thus effects commutation of the current i to the absorber circuit. The current i is reduced by the resistances in this absorber circuit A and is then finally interrupted by the quiescent current switch or circuit breaker $S_R$.

This commutation of the mains current i to the absorber circuit is simpler the more time is available to switch S for this process. FIG. 2 shows the time sequence of the switch current $i_s$ for two different values of mains currents $I_1$ and $I_2$ with different capacitor precharges Q. For sequences 1 and 3 the capacitor C is precharged with the same charge $Q_1$, while for sequence 2 the capacitor C is precharged with a change $Q_2$ which is less than $Q_1$. For the curves 1 and 2 the precharges are so selected that the zero line is just being touched at a minimum of the current curves. When the current approaches zero in this manner, switch S has more time for the commutation of the current to the parallel paths and the possibility of a successful commutation is thus much greater than in the case of curve 3 where the current $i_s$ intersects the zero line with a large slope. However, the current path $i_s$ which is favorable for the commutation, as it is shown for example in curves 1 or 2 of FIG. 2, can be obtained only for a certain current value when the capacitor precharge is constant.

SUMMARY OF THE INVENTION

The above drawbacks of the prior art arrangements of this type are overcome according to the invention by providing an additional means for causing the capacitor to be precharged to a value dependent on the current to be interrupted and/or the arc voltage and for effecting the current discharge path so that the switch has sufficient time during the commutation phase to increase its arc resistance to such an extent that the current is commutated into the parallel paths containing the capacitor and the energy absorber, respectively, and to prevent the current from commutating back into the switch.

A number of embodiments of circuit arrangements according to the invention are presented. According to one embodiment of the invention the capacitor is precharged by the output current of an amplifier which output current is proportional to the current through the interrupter switch and the arc voltage across the switch.

According to a further feature of the invention an additional inductance or resistance is connected in series with the capacitor, or in series with commutation switches to increase the commutation time of the interrupter switch.

According to a further embodiment of the invention the capacitor is charged in the proper polarity via resistors connected to opposite sides of the interrupter switch and the discharge circuit is completed by arc voltage responsive switches connected in series with the capacitor on either side thereof. Additionally, a plurality of such capacitors and arc voltage responsive switch combinations may be connected in series so as to provide a multiplication of the charging voltage.

According to still a further embodiment of the invention a further interrupter switch is connected in series with the first interrupter switch, and the series connection of a further capacitor, which has a large capacitance and a low rated voltage relative to the first capacitor, and a switch responsive to the arc voltage of the further interrupter switch is connected in parallel with the further interrupter switch.

BRIEF DESCRIPTION OF THE DRAWINGS

FIG. 4b shows the associated voltage time diagram for the arrangement of FIG. 4a.

DESCRIPTION OF THE PREFERRED EMBODIMENTS

Figure 1:
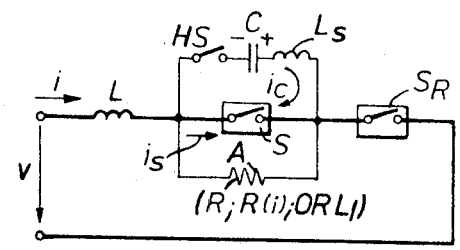
FIG. 1 is a schematic circuit diagram illustrating the principle of a circuit arrangement with a commutation device according to the prior art.
Figure 2:
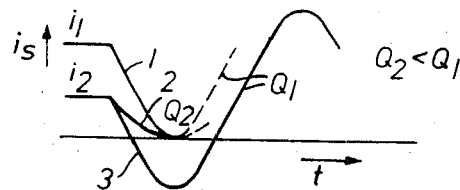
FIG. 2 is a current time diagram used in explaining the principle of the invention.
Figure 3:
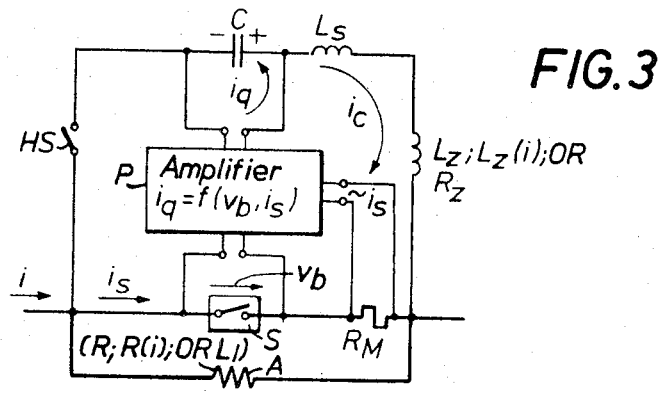
FIG. 3 is a schematic circuit arrangement according to the invention utilizing current and voltage dependent charging of a commutation capacitor.

Referring now to FIG. 3 there is shown a first embodiment of an improved commutation circuit according to the invention so as to provide current dependent charging of the commutation circuit capacitor C. In this and all succeeding Figures the same reference characters used in FIG. 1 are utilized to designate similar components. According to this embodiment of the invention the energy for charging capacitor C is provided by the switching arc created when switch S is opened only during the switching process and is dependent on the arc voltage $V_b$ and on the switching current $i_s$. In order to provide this charging current for the capacitor C, a measuring resistor Rm is connected in series with switch S and the voltage thereacross and the voltage across the switch S, i.e., the arc voltage $V_b$, are combined in a precharger P, i.e., an amplifier, which produces a charging current $i_q = f(V_b, i_s)$. Moreover, an additional inductance $L_z$, which may also be current dependent, i.e. $L_z(i)$, or an ohmic resistance $R_z$ is connected in the commutation circuit in series with the leakage inductance $L_s$. These elements serve to reduce the frequency of the oscillating or discharge current so that in the vicinity of the point when current $i_s$ becomes zero, its curve is sufficiently flat that the switch has sufficient time for commutation. After the subsequent closing of switch HS as a result of the arc voltage $V_b$ reaching a certain value, the capacitor C, which has been charged with the illustrated polarity by means of the output of amplifier P, begins to discharge and sends the discharge current $i_c$ through switch S in a direction opposite that of current $i$. The capacitor precharge and the switching elements C, $L_s$, $L_z$ or $R_z$, respectively, are so dimensioned that the switching current $i_s$ in the vicinity of its becoming zero follows a flat path, as shown in curve 1 or 2 of FIG. 2, and current $i$ commutates into the energy absorber circuit A connected in parallel with the switch S. The amplifier P is an amplifier with electron circuit packages and the supply voltage of the amplifier P is the arc voltage $V_b$ of the switch S. The value of the charge current $i_q$ is varied by the voltage $i_s R_M$ which is applied to the input of amplifier P.

Figure 4A:
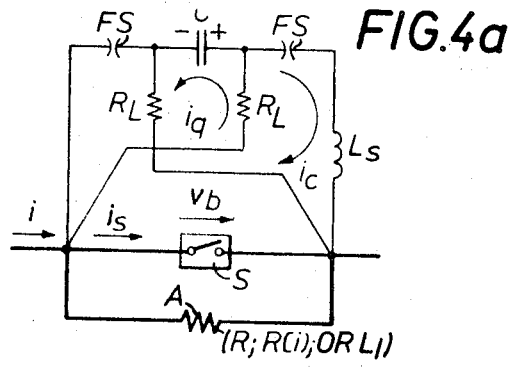
FIG. 4a illustrates a commutation circuit according to the invention utilizing current dependent charging of a commutation capacitor via charge resistors.

Capacitor C can also be charged by means of a switching arrangement as shown in FIG. 4a. Here the arc voltage $V_b$ appearing across switch S is applied to capacitor C in the proper polarity via a pair of charging resistors $R_L$. Additionally, in place of the single auxiliary switch HS, in order to switch on the commutation circuit, a pair of spark gap type switches FS, of the type well known in the art, are connected in series with the capacitor C, one on either side thereof. The effect of this circuit is such that when switch S is opened, an arc voltage $V_b$ is produced which voltage is produced in this case at a switch having arc cooling.

Figure 4B:
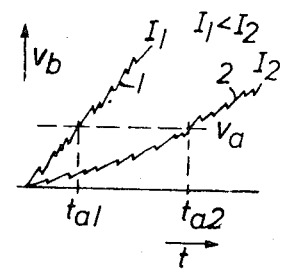

By suitably selecting the charging time constant $\tau = 2R_L \cdot C$, it is possible to precharge capacitor C to a somewhat smaller value for a small current $I_1$ until the actuation voltage $V_a$ of the spark gap paths FS at time $t = t_{a1}$ is reached than for a larger current $I_2$ as can be seen in FIG. 4b for curves 1 and 2.

Figure 5:
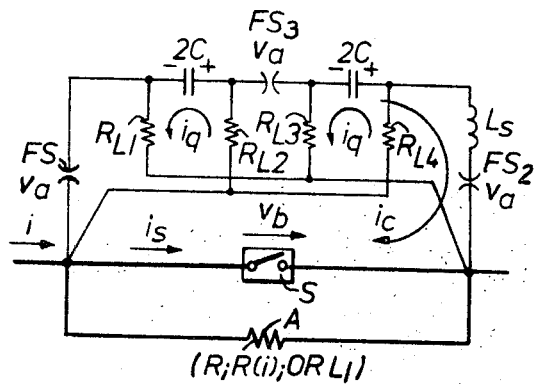
FIG. 5 illustrates a modification of the circuit arrangement of FIG. 4a utilizing a doubling circuit.

For switches with a very low arc voltage or so as to enable better utilization of the voltage capacity of the commutation capacitance, the circuit of FIG. 4 may be modified by using a voltage doubling circuit as shown in FIG. 5. In this embodiment the total capacitance of the discharge capacitor C of FIG. 4 is provided by two capacitors, each having a capacitance value of 2C, which are connected in series via an additional spark gap $FS_3$. The individual commutation capacitors 2C are charged by the arc voltage $V_b$ in parallel via resistors $R_{L1} - R_{L4}$ during the beginning of the switching or commutation process and are discharged in series via switch S when the spark gaps or paths $FS_1 - FS_3$ are triggered as a result of the arc voltage reaching the value $Va$. In this way capacitors can be precharged so that they provide four times the energy, provided in the simple precharging circuit according to FIG. 4a, with the other parameters of the circuit remaining the same.

Figure 6:
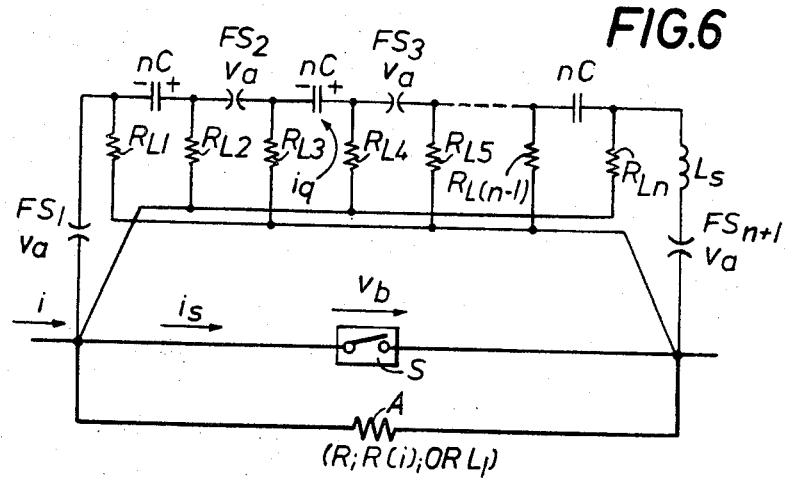
FIG. 6 illustrates a modification of the circuit arrangement of FIG. 5 utilizing an $n$-fold multiplier circuit.

An $n$-fold multiplication of the charging voltage is possible with the circuit according to FIG. 6 which is similar to FIG. 5 but contains n capacitors each having a value of $nC$ connected in series via spark gaps FS and charged in parallel via resistors $R_{L1} - R_{Ln}$ by the arc voltage $V_b$. In order for all $n$ charging currents $i_q$ to have the same time constant:

$\tau_i = \text{const} = n\ C\ (R_{L(2i-1)} + R_{L2i});\ i = 1, 2, 3, \ldots n$ e.g. $\tau_2 = n\ C\ (R_{L3} = R_{L4})$ Furthermore after commutation of the current $i$ to the absorber circuit A ($R(i)$ or $L_1$) in order for the partial capacitors $n\ C$ to be charged with identical voltages ($V_{Ci} = \text{const}$), the charging resistances $R_{LH}$ must be dimensioned as follows:

$$R_{LJ} = R_L[n - (j-1)/2]/n$$

where $j = 1, 3, 5, \ldots (2n-1)$ $$R_{LK} = R_L(k/2)/n$$

where $k = 2, 4, 6, \ldots 2n$

If all of the resistances $R_{Lm}$ with $m = 1, 2, 3, \ldots 2n$ consist of the series connection of the basic unit $R_L/n$, the voltage load and the energy loss with respect to the unit of length are identical for all resistors. The charging resistance $R_L$ and thus $\tau$ must also be so dimensioned that the capacitors $nC$ are sufficiently charged in the few milliseconds before commutation or switching of the current $i$ occurs, but that after commutation the parallel circuit containing the capacitors and charging resistances is highly resistant with respect to the resistance of the absorber circuit A. When suitable spark gaps or paths $FS_t$ are used, e.g. spark gaps capable of carrying a current of several hundred to one thousand amperes for several 10 ms, the charging resistors $R_{Lt}$ may simultaneously be dimensioned to serve as energy absorbers.

Figure 7:
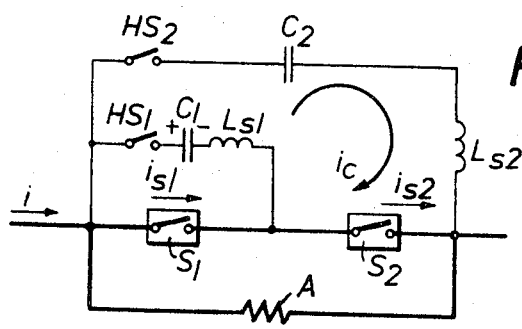
FIG. 7 illustrates a further cascade form of an embodiment of a commutation circuit according to the invention.

A further circuit arrangement for the current dependent precharging of a commutation capacitance is shown in FIG. 7. In this embodiment a further commutation or interrupter switch $S_1$ is connected in series with the commutation switch $S_2$ (which corresponds to switch S of FIG. 1) and a series circuit including a capacitor $C_1$ which has a large capacitance but a low rated voltage, an auxiliary switch $HS_1$, and a leakage inductance $L_{s1}$, is connected in parallel with the commutation switch $S_1$. Capacitor $C_1$ is charged by the mains current and is subsequently discharged to the capacitor $C_2$ which has a low capacitance but high rated voltage. Both of the switches $S_1$ and $S_2$ are triggered at the same time by an opening command. In the operation of this circuit when switch $S_1$ is opened, it produces an arc voltage. The capacitance of the capacitor $C_1$ is so great that after closing of auxiliary switch $HS_1$ by the arc voltage across $S_1$, commutation of the current $i$ to capacitor $C_1$ is assured and capacitor $C_1$ is now charged by the main current $i$. If the auxiliary switch $HS_2$ is a spark gap or path, the charging occurs independently of the magnitude of the main currents $i$ up to a fixed voltage. When switch $HS_2$ is an auxiliary switch which is switched on after a constant time interval $\Delta t$ upon actuation of switch $HS_1$, the precharging of capacitor $C_1$ is proportional to the magnitude of the current $i$ due to the relationship $\Delta t = \text{const}$ ($V_{C1} = (i/C_1) \cdot \Delta t$).

The circuit is so dimensioned that capacitor $C_1$ can be charged only to a few kV and then discharges, upon closing of $HS_2$, in the given direction via circuit $C_2 - L_{s2} - S_2$, with the discharge current $i_c$ producing a zero current passage in switch $S_2$, thus causing a commutation of the mains current to the absorber circuit A (R, R($i$) or L). After quenching of the arc of switch $S_1$ and closing of $HS_2$ the circuit exhibits the approximate behavior (due to $C_1 \gg C_2$) as if the precharged capacitor $C_2$ (same charge as in $C_1$) were discharged across $S_2$.

The disclosed circuit arrangements can also be provided at alternate ends with means which effect an additional influence on the current path if these means are not provided in the respective circuit arrangement per se.

It will be understood that the above description of the present invention is susceptible to various modification, changes and adaptations, and the same are intended to be comprehended within the meaning and range of equivalents of the appended claims.

We claim:

1. In a circuit arrangement for the current limiting interruption of direct and alternating currents at high voltages flowing in a power main having a commutation switch connected in said main, an energy absorbing high resistance circuit, and a series circuit including a capacitor, a leakage inductance and a normally open auxiliary switch means responsive to the arc voltage of said commutation switch, said energy absorbing circuit and said series circuit each being connected in parallel with said commutation switch, said capacitor being precharged so that upon opening of said commutation switch the discharge current from said capacitor will flow into said commutation switch in a direction opposite that of the current to be interrupted, said discharge current being of such magnitude that the current to be interrupted will commutate to at least said energy absorbing high resistance circuit wherein the current is reduced to a quiescent current value which is switched off by a circuit breaker subsequently connected in said main, the improvement wherein said circuit arrangement further includes circuit means for influencing the precharging of said capacitor and the capacitor discharge current path so that sufficient time is available to said commutation switch during the commutation phase to increase its arc resistance to such an extent that the current flow therein which is to be interrupted is commutated into the parallelly connected circuits and cannot commutate back into said commutation switch; and wherein said circuit means includes an additional inductance connected in series with said capacitor, said additional inductance being designed so that it delays the commutation process to the extent required for an increase in the arc resistance of said commutation switch, and means for causing said capacitor to be charged only during the commutation process.

2. The circuit arrangement defined in claim 1 wherein said circuit means includes means for charging said capacitor by the arc voltage.

3. The circuit arrangement defined in claim 2 wherein said means for charging causes said capacitor to be charged to a value dependent on the intensity of the current to be interrupted.

4. The circuit arrangement defined in claim 3 wherein said means for charging said capacitor comprises: a measuring resistor connected in series with said commutation switch and an amplifier circuit having its signal input connected across said measuring resistor and its supply voltage input connected across said commutation switch said amplifier provided the output value $i_q = f(i, V_b)$ where $i_q$ is the charging current for said capacitor, $i$ is the current to be interrupted and $V_b$ is the arc voltage across said commutation switch.

5. The circuit arrangement defined in claim 3 wherein said auxiliary switch means comprises a pair of spark gaps, one of which is connected on each side of said capacitor, in said series circuit, and wherein said charging means comprises a pair of resistive circuit paths connecting the terminals of said capacitor across said commutation switch.

6. The circuit arrangement defined in claim 5 wherein said capacitor includes a plurality of capacitors connected in series; wherein said pair of resistive circuit paths connects the terminals of each of said capacitors in parallel across said commutation switch so as to charge each capacitor in the same polarity; and wherein an additional spark gap is connected in said series circuit between each pair of capacitors, whereby a multiplier type charging circuit is provided.

7. The circuit arrangement defined in claim 6 wherein there are n capacitors and wherein all n charging currents of the multiplier circuit have the same time constant and the capacitors are all charged, after commutation of the current to be interrupted into the parallely connected high resistance circuit branch with identical voltages.

8. The circuit arrangement defined in claim 6 wherein the charge time constants of said charging means are dimensioned so that the capacitors are sufficiently charged in a few milliseconds before the commutation of the current to be interrupted occurs and during the duration of the arc formed by the opening of said commutation switch.

9. The circuit arrangement defined in claim 6 wherein said spark gaps are of sufficient size so that they can carry a current of from several hundred to one thousand amperes for several tens of milliseconds, and wherein the charging resistances in said resistive paths are dimensioned so that they simultaneously serve as energy absorbers.

10. In a circuit arrangement for the current limiting interruption of direct and alternating currents at high voltages flowing in a power main having a commutation switch connected in said main, an energy absorbing high resistance circuit, and a series circuit including a capacitor, a leakage inductance and a normally open auxiliary switch means responsive to the arc voltage of said commutation switch, said energy absorbing circuit and said series circuit each being connected in parallel with said commutation switch, said capacitor being precharged so that upon opening of said commutation switch the discharge current from said capacitor will flow into said commutation switch in a direction opposite that of the current to be interrupted, said discharge current being of such magnitude that the current to be interrupted will commutate to at least said energy absorbing high resistance circuit wherein the current is reduced to a quiescent current value which is switched off by a circuit breaker subsequently connected in said main, the improvement wherein said circuit arrangement further includes circuit means for influencing the precharging of said capacitor and the capacitor discharge current path so that sufficient time is available to said commutation switch during the commutation phase to increase its arc resistance to such an extent that the current flowing therein which is to be interrupted is commutated into the parallelly connected circuits and cannot commutate back into said commutation switch;

wherein said circuit means includes a further commutation switch connected in series with said first mentioned commutation switch and a series circuit, including a further capacitor and a further auxiliary switch means responsive to the arc voltage across said further commutation switch, connected across said further commutation switch, said further capacitor having a large capacitance but a low rated voltage; wherein said first mentioned capacitor has a low capacitance but a high rated voltage; and wherein said series circuit and said energy absorbing circuit are connected in parallel with the series connection of said commutation switches, whereby a discharge current flowing through said first mentioned capacitor after the arc has been quenched in said further commutation switch effects a zero current flow through said first mentioned commutation switch causing commutation of the current to be interrupted to said energy absorbing high resistance circuit.

* * * * *